United States Patent Office 3,730,923
Patented May 1, 1973

3,730,923
POLYURETHANE FOAMS DERIVED FROM TRIS(β-HYDROXYALKYL) ISOCYANURATE-ALKYLENE OXIDE ADDUCTS
Robert L. Formaini, Millington, and Edwin D. Little, Convent Station, N.J., assignors to Allied Chemical Corporation, New York, N.Y.
No Drawing. Continuation-in-part of application Ser. No. 738,851, June 21, 1968. This application Sept. 15, 1970, Ser. No. 72,509
Int. Cl. C08g 22/14, 22/44
U.S. Cl. 260—2.5 AQ          8 Claims

ABSTRACT OF THE DISCLOSURE

Polyether polyols, derived from tris(β-hydroxyalkyl)-isocyanurates and alkylene oxides are reacted with organic polyisocyanates in the presence of a blowing agent and catalyst to produce urethane foams of improved properties.

---

This application is a continuation-in-part of our application Ser. No. 738,851, filed June 21, 1968, now abandoned, entitled "Tris(β-Hydroxyalkyl)Iisocyanurate-Alkylene Oxide Adducts."

Tris(2-hydroxyethyl)isocyanurate and polyesters derived therefrom are known in the literature. However, the prior art does not provide a means of modifying the tris (2-hydroxyalkyl) isocyanurates to take advantage of varied physical and chemical properties.

In our co-pending application Ser. No. 738,851, filed June 21, 1968, various alkylene oxide adducts of tris(β-hydroxyalkyl)isocyanurates are prepared which are useful for a variety of purposes.

The present invention relates to the preparation of polyurethane foams employing said alkylene oxide adducts of tris(β-hydroxyalkyl)isocyanurates.

Polyether-urethane foams are expanded cellular materials formed by reacting a polyol, for example, a polyether glycol or triol with an aromatic polyisocyanate, usually tolylene diisocyanate. These cellular structures are useful for many applications, particularly foamed-in-place applications such as thermal insulation, sandwich construction, building panels, etc. To meet the requirements of these applications, the foamed product must possess outstanding chemical, physical and mechanical properties and these properties are usually controlled by the structure and molecular size of the polyol. Many rigid foam grade polyether polyols on the market have been based on trihydroxy compounds such as trimethylol propane and trishydroxyphenyl propane. Tris(hydroxyethyl)isocyanurate, another trihydroxy compound, possesses, a number of unique characteristics which make it an attractive building block for resin systems. Its isocyanurate nucleus imparts thermal and weather resistance while its symmetrical configuration and primary hydroxyl groups, respectively, provide improved mechanical benefits and ready reactivity. However, attempts to utilize these isocyanurates as components for urethane foam preparation have been unsuccessful primarily because of the incompatibility of the isocyanurate component with other ingredients of the foam formulation.

Tris(hydroxyethyl)isocyanurate is a solid and is practically insoluble in the polyisocyanate portion of the formulation. Moreover, it possesses very low solubility in commercial polyols which prevents its use with these products either as a modifying agent for the polyether polyols or in admixture therewith for subsequent use in foam formulations.

It has now been found that when these isocyanurates are modified via reaction with alkylene oxides, they become compatible with both polyisocyanates and other polyols and allow preparation of polyurethane foams which possess improved properties.

In accordance with the present invention, polyols which are tris(β-hydroxyalkyl)isocyanurate-alkylene oxide adducts, are employed for the production of rigid urethane foams, said foams being produced by reacting a tris(β-hydroxyalkyl)isocyanurate-alkylene oxide adduct with an organic polyisocyanate, either per se or in admixture with other polyols, in the presence of various adjuvants such as blowing agents, activators or catalysts, acid dispersing agents or emulsifiers as is now conventional practice. The foams can be made by the one-shot technique using either a volatile fluorocarbon or carbon dioxide generated by the reaction of water with the isocyanate functional group as the blowing agent.

The tris(β-hydroxyalkyl)isocyanurate-alkylene oxide adducts employed herein are of the formula:

(I)

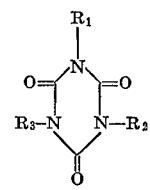

wherein $R_1$ is a hydroxy-terminated oxyalkylene chain of from 2 to 30 oxyalkylene units and $R_2$ and $R_3$ are each a hydroxy terminated oxyalkylene chain of from 1 to 30 oxyalkylene units. Each oxyalkylene unit is of the formula

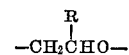

wherein R is hydrogen, methyl or ethyl, i.e., each unit contains from 2 to 4 carbon atoms. The tris(β-hydroxyalkyl)isocyanurate-alkylene oxide adducts are more specifically represented by the formula:

(II)

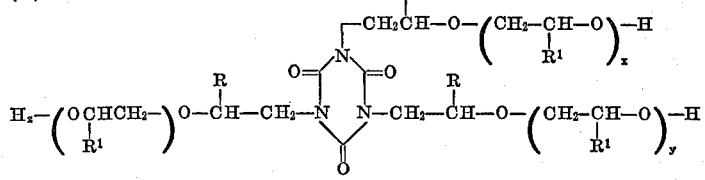

wherein R and $R^1$ are hydrogen, methyl or ethyl; $x$, $y$ and $z$ are each an integer of 0 to 30 with the proviso that at least one of $x$, $y$ or $z$ is at least 1.

Those compounds wherein $x$, $y$ and $z$ are integers of 1 to 3 are especially preferred.

The preferred adduct are tris(polyoxyalkylene)isocyanurates, derived from tris(2-hydroxyethyl)isocyanurate and propylene oxide, and are of the formula:

(III)

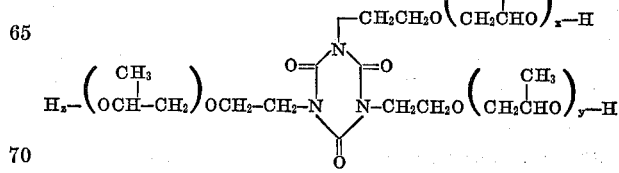

wherein $x$, $y$ and $z$ are as defined above.

In general, the isocyanurates employed herein will have a hydroxyl number within the range of about 130 to about 550. Mixtures of tris(polyoxyalkylene)isocyanurates, particularly those with a hydroxyl number (OH No.) of 300 to 400 are preferred.

The instant tris ($\beta$-hydroxyalkyl)isocyanurate-alkylene oxide adducts, hereafter referred to as isocyanurate-alkylene oxide polyols, are prepared by reacting the corresponding tris($\beta$-hydroxyalkyl) isocyanurate with an appropriate amount of alkylene oxide at elevated temperature in the presence of an acid catalyst.

Tris($\beta$-hydroxyalkyl)isocyanurates of the formula:

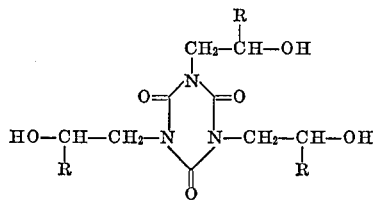

wherein R is hydrogen, methyl or ethyl, are readily prepared by procedures disclosed in U.S. Patent 3,088,948, wherein cyanuric acid is reacted wiht alkylene oxide.

The instant isocyanurate-alkylene oxide polyols may be prepared from the tris($\beta$-hydroxyalkyl)isocyanurates by further acid-catalyzed reaction with alkylene oxide, which may be the same alkylene oxide originally reacted with the cyanuric acid or a different one. The reaction may be conducted with or without a solvent, most conveniently without a solvent. For this latter procedure, the isocyanurate is heated to above its melting point and the alkylene oxide is bubbled through the molten material. In the case of tris(2-hydroxyethyl)isocyanurate a reaction temperature between about 134° C. (the melting point) and 160° C. is appropriate. Temperatures in excess of about 160° C. lead to side reactions which interfere with the desired reaction. Preferably, the temperature will be between about 134° C. and 148° C. Also, after the initial phase of the reaction, it is possible to lower the temperature below the melting point of the tris($\beta$-hydroxyalkyl) isocyanurate since the melting point of the product is lower than that of the reactant. In conducting the reaction without a solvent, it is only necessary that the temperature be maintained high enough to afford a molten or fused reaction mixture. Of course, temperatures higher than the minimum may be preferred to increase the rate of reaction. The particular range for the various hydroxyalkyl compounds can be easily determined by noting the minimum temperature necessary to maintain a molten mixture and the maximum temperature before the extent of side reactions becomes unacceptable.

In conjunction with the reaction temperatures set forth above, substantially atmospheric or superatmospheric pressure may be employed. We prefer to operate at pressures between atmospheric and 150 p.s.i.g. The reaction is preferably conducted in an autoclave with pressure varying with the actual temperature and with the addition and consumption of the alkylene oxide, which is bubbled through the reactant as a gas or as a liquid under pressure.

The reaction might also be conducted in the presence of a solvent, which should be inert to the reactants and products at the temperatures employed. Among the inert solvents which may be employed are trialkylisocyanurates, N-methylpyrrolidone, acetone, dimethyl ethers of polyethylene, dimethyl ethers of polypropylene glycols, and dialkyl carbonates. Certain solvents such as dimethylformamide should be avoided since they lead to the formation of oxazolidones from the reactant while alcohols and glycols will react with the alkylene oxide. The reaction is preferably conducted in an autoclave at the same reaction temperatures and pressures as are specified hereinabove for the fusion process. The pressure will vary with the temperature and as the alkylene oxide is added and consumed.

An etherification-type catalyst must be added to the reaction medium to obtain the polyhydroxyalkylated material. These catalysts have high dissociation constants and produce a pH ranging between about 0 and 6. Suitable examples of the catalysts include mineral acids such as sulfuric acid, phosphoric acid; Lewis acids such as boron trifluoride and its hydrates and etherates; organic acids such as trichloroacetic acid, aromatic sulfonic acids, illustratively benzenesulfonic acid and toluene-sulfonic acid, and the like.

Although the quantity of catalyst may vary over a large range it is preferred to employ the catalyst in an amount of about 0.5 to 2%, by weight, of the tris($\beta$-hydroxyalkyl)isocyanurate. The amount of catalyst used must be sufficient to afford a controlled pH level above specified.

The progress of the reaction may be followed by change in pressure accompanying consumption of the alkylene oxide. Normally, the reaction is complete within 24 hours, although lower temperatures, slow addition of alkylene oxide, etc. may require longer reaction times.

When prepared without a solvent, the material is recovered by cooling and removal from the reaction vessel. When a solvent is employed in the reaction, recovery by distillation is convenient.

Normally, the reaction of tris ($\beta$-hydroxyalkyl)isocyanurate with alkylene oxide will result in a symmetrical product, i.e., addition of 6 moles of oxide per mole of isocyanurate will afford a product with 2 alkylene oxide units adding to each hydroxyalkyl group of the reactant, e.g., $x$, $y$, and $z$ will each be 2 in Formula II above. However, polyalkyleneoxy chains of differing lengths may be obtained in the same molecule by blocking one or two of the chains, building up the unblocked chains to the desired length, and then removing the blocking group. Blocking might be accomplished by esterification with an acid which will not hydrolyze under the hydroxyalkylation condition, by chlorination with thionyl chloride, etc.

The instant isocyanurate-alkylene oxide polyols might also be prepared by reacting cyanuric acid with at least a 4-fold molar excess of alkylene oxide under acidic conditions. This reaction is preferably conducted in a solvent inert to the cyanuric acid, the oxide reagents, and the intermediate products. Solvents listed hereinabove for the reaction of tris ($\beta$-hydroxyalkyl)isocyanurates and alkylene oxide are suitable. Also, the catalysts listed hereinabove, which are strong organic and mineral acids, are suitable catalysts for this reaction.

Preferred isocyanurate-alkylene oxide polyols are the reaction products of tris($\beta$-hydroxyethyl)isocyanurate with a 1 to 12, and especially 1 to 6 molar amount of ethylene oxide or propylene oxide.

Other reactants containing reactive hydroxyl groups may be included, if desired, in combination with the isocyanurate-alkylene oxide polyols in the preparation of foams according to this invention. These are of the type normally used for the manufacture of rigid foams. However, in order to realize the objectives of this invention, it is desirable that the isocyanurate-alkylene oxide polyol comprise at least about 10% of the total poylol mixture. Mixtures of isocyanurate-alkylene oxide polyols with polyether polyols wherein the isocyanurate comprises at least 30% by weight of the mixture are preferred although special advantages may be derived when employing 100% isocyanurate-alkylene oxide polyol as illustrated further hereinbelow.

The polyhydroxy compounds which are suitable for admixture with the isocyanurate-alkylene oxide polyols of the invention are well known in this art in the preparation of rigid foams. They include reaction products of trimethylolpropane, 1,2,6-hexanetriol, pentaerythritol, sorbitol, glycerol, triethanolamine, diethylene triamine, methyl glucoside, sucrose, etc. with alkylene oxides in the well-known manner and in general have OH Nos.

in the range of about 300 to 600, preferably about 400 to 550.

A general discussion of polyether polyols and their preparation can be found in Saunders et al., Polyurethanes, Chemistry and Technology, Part I, Chemistry, High Polymers, vol. XVI, Interscience Publishers, 1962, pp. 32–42.

A wide variety of polyisocyanates and polymers thereof may be used in preparing the cellular urethanes of our invention. Organic aromatic diisocyanates are preferred. Among examples of suitable polyisocyanates, are the following:

m-phenylene diisocyanate
2,4-tolylene diisocyanate
2,6-tolylene diisocyanate
naphthalene-1,5-diisocyanate
methylene-bis(4-cyclohexylisocyanate)
methylene-bis(4-phenylisocyanate)
1,6-hexamethylene diisocyanate
4,4',4"-triphenylmethane triisocyanate
1,3,5-benzene triisocyanate Crude polyisocyanate compositions, as described in U.S. Patents 3,316,286, 3,420,752, 341,462, 3,359,295 are particularly suitable. These products are crude isocyanates which are phosgenation products of toluene diamine with or without modification by reaction with a polyol or similar difunctional compound. In general, they are undistilled toluene diamine phosgenation products comprising essentially diisocyanates, which compositions have viscosities within the range of 20 to 10,000 cps. at 25° C. and amine equivalents within the range of 90 to 130.

Mixtures of the above polyisocyanates and equivalent compounds or compositions may also be used.

A general discussion of polyisocyanates and their preparation can be found in Saunders et al., cited supra.

The addition of fillers to urethane foams is conventional in the art and may be likewise employed herein if desired. The filler used may be any finely divided solid which is substantially insoluble in, and non-reactive with, the other components of the composition. As typical examples of the fillers which may be used in these formulations, the following are mentioned:

aluminum silicate
calcium carbonate
barium sulfate
kaolin
wood cellulose
copper phthalocyanine
cadmium selenide
carbon black
silica
titanium dioxide (anatase and rutile forms)
mica
organic resins and polymers, e.g. polystyrene, polyvinyl acetate
iron oxides Mixtures of these and equivalent substances are contemplated also.

Suitable blowing agents are well-known in the art, but we prefer to use a low-boiling halogenated aliphatic saturated hydrocarbon. Examples of these blowing agents include:

trichloromonofluoromethane
dichlorodifluoromethane
monochlorotrifluoromethane
dichlorotetrafluoroethane
tetrachlorodifluoroethane
1,1-difluorethane
1,1,1-monochloridifluoroethane
methylene chloride Mixtures of these compounds and equivalent compounds may also be used in our invention.

The blowing agents are characterized by being liquids or gases at normal temperatures and pressures, having poor solvent power for the organic polymer and boiling at or below temperatures generated by the polymerization reaction, usually not in excess of about 175° C. The agents preferably have significant solubility in the polyisocyanate component and, when in the gaseous state, have a molecular size such that they do not diffuse readily through the interstices of the polymer molecules at ambient temperatures. The amount of blowing agent may vary from about 2% up to 40% or more by weight of the polyol.

A catalyst, accelerator or activator is used to promote or otherwise regulate the reaction between the polyisocyanate and the polyol. Tertiary amines such as triethylamine, dimethylethanolamine, pyridine, quinoline, N-alkyl morpholines and the like are conventionally used. Tin salts such as dibutyl tin dilaurate, tributyl tin octanoate, bis(2-ethylhexyl)-tin oxide, dibutyl tin dichloride, tin hexanoate, stannous octoate and the like may be used alone or in conjunction with the above described tertiary amines. The amount of catalyst used may range from about 2 to 12 percent or more by weight based on the weight of the polyol. The catalyst can be introduced at any desired time although it is generally added to the polyol component prior to reaction thereof with the polyisocyanate component.

If desired, emulsifying agents may be used to improve the intermixing of the polyol and polyisocyanate components which are usually mutually insoluble. The polymerization reaction may be assisted by vigorous agitation and also by use of these emulsifying agents. Any of a number of known emulsifying agents can be used. We prefer, however, to employ siloxane-oxyalkylene block copolymers which have the general formula

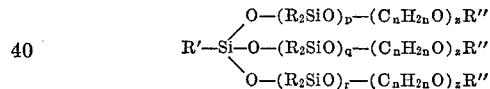

in which R, R' and R" are $C_{1-8}$ alkyl radicals, $p$, $q$ and $r$ are integers ranging from 2 to 15 and $-(C_nH_{2n}O)_z-$ is a polyoxyalkylene block which is preferably a polyoxyethylene-polyoxypropylene block containing from 10 to 50 of each oxyalkylene unit. These siloxane-oxyalkylene block polymers are commercially available, one such being marketed under the trade designation "Silicone L–520" in which, referring to the general formula above, $R=CH_3$, $R'=C_2H_5$, $R''=C_4H_9$, $p$, $q$ and $r=7$ and the block $(C_nH_{2n}O)_z$ is a polyoxyethylene-polyoxypropylene block containing 50 units of each oxyalkylene moiety. Other emulsifying agents suitable for use in the invention include polyethylene phenol ether, blends of polyalcohol carboxylic acid ester, oil-soluble sulfonates and the like.

If desired, the flame retardancy of the cellular urethane products of this invention can be implemented by use of known flame retardant agents. Such agents, as is known, may or may not contain groups which are reactive with polyisocyanates. In the former instance, the amount of polyisocyanate used should be adjusted to accommodate the reactive group. Representative of these fire retardants are:

(1) Non-reactive agents:
    antimony trioxide
    tris(chloroethyl)phosphate
    tris(2,3-dichloropropyl)phosphate
    tris(2,3-dibromopropyl)phosphate
    bis(beta chloroethyl)vinyl phosphate
(2) Reactive agents:
    chlorinated diphenol
    2-hydroxyethyl phosphite It is a feature of the instant invention that foams prepared from isocyanate-alkylene oxide polyols possess excellent fire-retardant properties even in the absence of flame retardant agents as will be illustrated hereinbelow, and in some instances, possess self-extinguishing characteristics depending on the proportion of isocyanate-alkylene oxide polyol relative to other polyol employed in the formulation.

The polymerization ingredients and additives can be mixed in various ways. Generally, the polyol together with catalyst, emulsifying agents and other adjuvants are premixed and then added together with the polyisocyanate and blowing agent to a mixing apparatus. The amount of polyol and polyisocyanate employed may vary over a wide range. Preferably, the polyol is reacted with an amount in excess of the equimolar quantity of the polyisocyanate. For example, an amount of polyisocyanate is used which is sufficient to provide a ratio of isocyanate to hydroxyl groups (NCO/OH ratio) within the range of about 0.9 to 1.5:1. Especially preferred is the use of an NCO/OH ratio of about 1.0–1.3:1.0.

If desired, the blowing agent can be introduced into the "premix" rather than the polyisocyanate. The mixture of premix and polyisocyanate is thoroughly agitated, preferably at room temperature, to insure the blending of the reactants and is then poured or otherwise introduced into a suitable mold and permitted to form freely therein. The foam is then allowed to set at ambient temperature or "cured" by placing the foam in a heated enclosure for a predetermined period dependent on the requirements of the particular system employed. The operation may be conducted at atmospheric, superatmospheric or subatmospheric pressure but for convenience and economy is conducted under substantially atmospheric pressure.

The polyurethane foams produced from the isocyanate-alkylene oxide polyols of this invention are high quality having excellent dimensional stability, low friability, low K-factor rise with aging and good overall physical properties. The foams produced from these isocyanate-alkylene oxide polyols have eminently desirable, yet uncommon characteristics when subject to fire—they are non-melting and, in some instances, self-extinguishing.

The following examples illustrate the invention.

EXAMPLE I

Preparation of tris(2-hydroxypropyloxyethyl) isocyanurate

Into a 300 ml. stainless steel autoclave, which is provided with a stirrer, there was charged tris(2-hydroxyethyl)-isocyanurate (260 g.), which was recrystallized from methanol, and 0.3 to 0.5 g. of concentrated sulfuric acid. The autoclave was sealed, flushed with nitrogen and the material slowly heated to 130–135° C. to obtain fusion. Thereafter, 10 g. of propylene oxide was added under nitrogen pressure. The reaction mixture was heated to 170–175° C. while 180 g. of propylene oxide was added incrementally. The reaction was maintained at 170–175° C. and the pressure ranged between 10 and 60 p.s.i.g. After 4 to 5 hours, the reaction mixture was cooled and viscous, light orange material was removed from the autoclave. The material, tris(2-hydroxypropyloxyethyl)isocyanurate had a viscosity of 12,000 cps. at 25 °C., and had a hydroxyl number of approximately 330.

The procedure is repeated wherein tris(2-hydroxyethyl)isocyanurate is respectively reacted with a 4-fold excess of propylene oxide to yield 1(2-hydroxypropyloxy-2-methylethoxyethyl) 3,5 - di(2-hydroxypropyloxyethyl) isocyanurate having a hydroxyl number of 360. A 6-fold excess of propylene oxide yielded a tris(polyhydroxypropylated)isocyanurate having a hydroxyl number of about 260.

EXAMPLE II

Preparation of polyurethane foam 100 parts by weight of a blend of 50 parts of the polyol prepared in Example I having a hydroxyl number of about 330 and 50 parts of the polyol prepared in Example I having an OH No. of about 360 was thoroughly stirred with 40.2 parts of "Genetron 11" (trichlorofluoromethane), a blowing agent, 1.6 parts by weight of "L-310," a silicone emulsifying agent, 0.1 part by weight of dimethylethanolamine and 0.18 part by weight of a catalyst mixture composed of 30% by weight triethylene diamine and 66% by weight of dipropylene glycol, to form a premix which was mixed with 97 parts by weight of a crude toluene diamine phosgenation product modified with about 20% by weight of a phosphate containing diol ("Vircol–82", Mobil Chemical Corp.), having a viscosity of 1200–1800 cps. at 2° C. and an amine equivalent of 145 to 155 to provide a NCO/OH ratio of 1.05.

The foam formulation was dispersed immediately into a mold of appropriate height at room temperature and allowed to reach full height. It was permitted to stand for 24 hours at room temperature before testing.

The resultant foam had a density of about 1.97 and exhibited the following fire-retardant properties:

(A) Foam reactivity:
  Cream time, seconds _____ 23
  Gel time, seconds _____ 65
  Tack free time, seconds _____ 100

(B) Flammability characteristics:
  Burning rate in./min. _____ 1.81
  Extinguishing time, sec. _____ 39
  Inches burned _____ 1.17
  Self-extinguishing _____ Yes The following rigid cellular foams were prepared employing the procedure of Example II differing therefrom primarily in the polyols employed.

Foam A

A premix composed of:
  (1) 70 parts of a sorbitol initiated-polypropylene oxide polyether polyol having an OH No. of 490.
  (2) 15 parts of the isocyanurate polyol of Example I having an OH No. of 330.
  (3) 15 parts of the isocyanurate polyol of Example I having an OH No. of 360.
  (4) 34.5 parts trichlorofluoromethane blowing agent.
  (5) 1.35 parts water.
  (6) 2.0 parts silicone emulsifier.
  (7) 3.0 parts dimethylethanolamine.
  (8) 0.75 part of a catalyst mixture composed of 33% by weight of triethylene diamine and 66% by weight propylene glycol was added to 112.2 parts of a crude glycol modified toluene diamine phosgenation product having a viscosity of 30 cps. at 25° C. and an amine equivalent of 10%. The NCO/OH was 1.05. The mixture was poured into a mold preheated to 115° F. and was cured for 25 minutes at 140° F. before testing.

Foam B

The formulation for Foam B was the same as that for Foam A except for the following:
  (1) 100 parts of a sorbitol initiated-propylene oxide polyether polyol having an OH No. of 490 was employed and the isocyanurate polyols were omitted.
  (2) 120.8 of the modified crude diisocyanate used in Foam A were employed. The NCO/OH ratio was 1.05. Mold temperature and cure conditions were the same as in Foam A.

Foam C

A premix composed of:

(1) 35 parts of a sucrose-glycerine initiated propylene oxide polyether polyol having an OH No. of about 460.

(2) 35 parts of a sucrose-glycerine initiated propylene oxide polyether polyol having an OH No. of about 530.

(3) 15 parts of the isocyanurate polyol of Example 1 having an OH No. of 330.

(4) 15 parts of the isocyanurate polyol of Example 1 having an OH No. of 360.

(5) 15 parts of a glycerine-initiated propylene oxide polyether triol having an OH No. of 160.

(6) 15 parts of a propoxylated diethylene triamine pentol having an OH No. of 475.

(7) 43.57 parts of trichlorofluoromethane.

(8) 1.6 parts silicone emulsifier.

(9) 1.6 parts dimethylethanolamine.

(10) 2.4 parts of a catalyst composed of 33% by weight trimethylene diamine and 66% by weight dipropylene glycol was added to 160 parts of the crude toluene diisocyanate employed in Example II. The NCO/OH ratio was 1.05. The foam formulation was poured into a mold, at room temperature and permitted to stand 24 hours at room ttmperature before testing.

Foam D

The formulation for Foam D was the same as that for Foam C except for the following:

(1) 50 parts of the sucrose-glycerine initiated polyol having an OH No. of 460 and 50 parts of the sucrose-glycerine initiated polyol having an OH No. of 530 were employed and the isocyanurate polyols were omitted.

(2) 173 parts of the crude toluene diisocyanate employed in Foam C were employed. The NCO/OH ratio was 1.05. Cure conditions were the same as in Foam C.

The foams were tested for properties and the results are shown in the table which follows:

TABLE

| | Foam A | Foam B | Foam C | Foam D |
|---|---|---|---|---|
| A. Reactivity: | | | | |
| Cream time, sec | 8 | 10 | 10 | 13 |
| Gel time, sec | 48 | 65 | 50 | 65 |
| Tack free time, sec | 60 | 100 | 65 | 90 |
| B. Physical properties: | | | | |
| Density, lbs./cu. ft.: | | | | |
| Core | 1.69 | 1.70 | 1.97 | 1.97 |
| Overall | 1.97 | 1.95 | | |
| Tensile strength, p.s.i | 35.7 | 43.5 | 42 | 42.9 |
| Flexural strength, p.s.i | 35.3 | 36.3 | 44.5 | 41.3 |
| Porosity, percent open cells | 5.3 | 7.2 | 5.6 | 6.7 |
| Friability index, in.-lbs./in. penetration | 76.3 | 67.4 | 84 | 81 |
| Friability—ASTM tumbling test, percent less in weight: | | | | |
| After 120 r.p.m | 0.82 | 3.20 | 1.52 | 1.81 |
| After 600 r.p.m | 4.76 | 18.11 | 4.22 | 6.58 |
| K-factor, B.t.u./(hr.) (sq. ft.) (° F./in.): | | | | |
| After 24 hrs., 80° F | 0.110 | 0.111 | 0.121 | 0.120 |
| After 3 days, 140° F | 0.114 | 0.143 | 0.146 | 0.165 |
| After 10 days, 140° F | 0.145 | 0.152 | 0.163 | 0.170 |
| Dimensional stability, percent change: | | | | |
| Days at, ° C | 70 | ¹38 | 70 | ¹38 | 110 | 110 |
| 0 | 0.51 | 0.11 | 0.85 | 0.97 | 42 | 37 |
| 3 | 0.90 | 0.31 | | | 51 | 47 |
| 7 | 0.90 | 0 | 1.26 | 0.57 | 33 | 45 |
| 10 | 1.40 | 0.06 | 1.34 | 0.66 | 32 | 44 |
| 13 | 1.60 | 0.44 | 1.58 | 0.80 | 27 | 41 |
| 17 | 1.60 | 0.30 | 1.75 | 1.02 | 24 | 40 |
| 20 | 1.50 | 0.24 | 1.63 | 0.62 | 21 | 38 |
| Flammability: | | | | |
| Burning rate, in./min | | | 2.54 | 3.09 |
| Extinguishing time, sec | | | 106 | 100 |
| Inches burned | | | 5.00 | 4.98 |
| Self-extinguishing | | | No | No |

¹ Humid chamber.

It can thus been seen that tris (β-hydroxyalkyl)isocyanurate-alkylene oxide adducts in accordance with the invention are not only compatible with the other components of the foam formulation but also enable the production of foams possessing a number of improved properties as compared with foams produced from conventional rigid foam polyether polyols.

We claim:

1. A rigid polyurethane foam which is the reaction product of a one-shot process comprising admixing and reacting:

(a) an organic polyisocyanate;
(b) a polyol which is a mixture of
  (1) a tris(β-hydroxyalkyl)isocyanurate-alkylene oxide adduct of the formula:

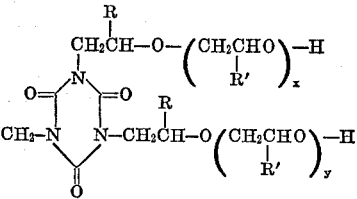

wherein R and R' are selected from the group consisting of hydrogen and methyl, and $x$, $y$, and $z$ are each an integer of 0 to 30 with the proviso that at least one of $x$, $y$, or $z$ is at least 1, said tris(β-hydroxyalkyl)isocyanurate-alkylene oxide adduct having a hydroxyl number within the range 130 to 550; and
  (2) a polyether polyol having a hydroxyl number in the range of 300 to 600; wherein at least 10 percent by weight of said mixture being comprised of said tris(β-hydroxyalkyl)isocyanurate-alkylene oxide adduct;
(c) a blowing agent; and
(d) a catalyst.

2. A rigid polyurethane foam as claimed in claim 1 wherein $x$, $y$, and $z$ are each an integer of 1 to 3.

3. A rigid polyurethane foam as claimed in claim 1 wherein $x$, $y$, and $z$ are each 1.

4. A rigid polyurethane foam as claimed in claim 1 wherein polyol (1) is a tris(β-hydroxyalkyl)isocyanurate-alkylene oxide adduct.

5. A rigid polyurethane foam as claimed in claim 1 wherein said isocyanurate-alkylene oxide adduct comprises at least 30 percent by weight of said polyol mixture, said polyisocyanate is a crude toluene diamine phosgenation product, and said catalyst is a tertiary amine.

6. A rigid polyurethane foam as claimed in claim 1 wherein polyol (1) is a mixture of tris(β-hydroxyalkyl)isocyanurate-alkylene oxide adducts having hydroxyl numbers within the range of 300 to 400.

7. A rigid polyurethane foam as claimed in claim 1 wherein said polyisocyanate is a crude toluene diamine phosgenation product.

8. A rigid polyurethane foam as claimed in claim 1 wherein the polyisocyanate is toluene diisocyanate.

(References on following page)

References Cited

UNITED STATES PATENTS

| | | | |
|---|---|---|---|
| 3,573,301 | 3/1971 | Winter | 260—2.5 AW |
| 3,541,034 | 11/1970 | Fuzesi | 260—2.5 AS |
| 3,480,589 | 11/1969 | Jordan | 260—77.5 NC |
| 3,442,888 | 5/1969 | Degginger | 260—2.5 AS |
| 3,342,780 | 9/1967 | Meyer | 260—77.5 NC |
| 3,174,950 | 3/1965 | Cordier | 260—77.5 NC |
| 3,121,082 | 2/1964 | Guttag | 260—2.5 AW |
| 3,088,948 | 5/1963 | Little | 260—248 NS |
| 3,410,854 | 11/1968 | Mac Gregor | 260—248 NS |
| 3,506,660 | 4/1970 | Schneider | 260—248 NS |
| 2,499,365 | 3/1950 | De Groote | 260—51 EP |

DONALD E. CZAJA, Primary Examiner

C. W. IVY, Assistant Examiner

U.S. Cl. X.R.

260—2.5 AW, 248 NS